US009979711B2

United States Patent
Ravinutala et al.

(10) Patent No.: US 9,979,711 B2
(45) Date of Patent: May 22, 2018

(54) AUTHENTICATION FOR VLAN TUNNEL ENDPOINT (VTEP)

(71) Applicant: Cisco Technology, Inc., San Jose, CA (US)

(72) Inventors: Veera Raghavendra Prasad Ravinutala, Fremont, CA (US); Anuj Mittal, Santa Clara, CA (US); Sandeep Subramaniam, Pleasanton, CA (US); Sanjay Basavanakattimatha, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 14/751,870

(22) Filed: Jun. 26, 2015

(65) Prior Publication Data

US 2016/0381015 A1    Dec. 29, 2016

(51) Int. Cl.
*H04L 29/06* (2006.01)
*H04W 12/06* (2009.01)
*H04W 80/02* (2009.01)

(52) U.S. Cl.
CPC .......... *H04L 63/08* (2013.01); *H04L 63/0272* (2013.01); *H04W 80/02* (2013.01); *H04L 63/1483* (2013.01)

(58) Field of Classification Search
CPC ............. H04L 63/0876; H04L 12/4633; H04L 12/4641; H04L 43/10; H04L 43/0811; H04L 41/06; H04L 9/321; H04L 63/08; H04L 63/0892; H04W 12/06; H04W 80/02
See application file for complete search history.

(56) References Cited

U.S. PATENT DOCUMENTS

| 7,649,890 | B2 * | 1/2010 | Mizutani | H04L 47/2408 370/395.21 |
| 7,917,647 | B2 * | 3/2011 | Cooper | H04L 12/2602 370/229 |
| 8,018,953 | B1 * | 9/2011 | Zhao | H04L 45/00 370/238 |
| 8,533,461 | B2 * | 9/2013 | Liu | H04L 9/321 380/272 |
| 8,578,164 | B2 * | 11/2013 | Pang | H04L 9/0847 713/165 |

(Continued)

OTHER PUBLICATIONS

Rfc3748—sections 4 and 5—https://tools.ietf.org/html/rfc3748.*

(Continued)

*Primary Examiner* — Saleh Najjar
*Assistant Examiner* — Shu Chun Gao
(74) *Attorney, Agent, or Firm* — Edell, Shapiro & Finnan, LLC

(57) ABSTRACT

A first network device configured as a first Virtual Local Area Network (VLAN) Tunnel Endpoint (VTEP) may receive a packet from a second network device. The first VTEP may determine that the second network device is a second VTEP and has not been established as a peer VTEP to the first VTEP. The first VTEP may maintain a status for the second network device as authentication pending, receive an authentication packet from the second network device and authenticating the second network device as a peer VTEP using the authentication packet.

20 Claims, 8 Drawing Sheets

(56) References Cited

U.S. PATENT DOCUMENTS

| | | | |
|---|---|---|---|
| 8,769,647 B2* | 7/2014 | Liang | H04L 12/4625 |
| | | | 380/270 |
| 9,485,147 B2* | 11/2016 | Gu | H04L 12/4641 |
| 9,596,585 B2* | 3/2017 | Abhishek | H04W 8/005 |
| 9,727,512 B1* | 8/2017 | Swartzentruber | G06F 13/4027 |
| 2008/0115203 A1 | 5/2008 | Elzur | |
| 2010/0080238 A1 | 4/2010 | Allan et al. | |
| 2012/0177046 A1* | 7/2012 | Yamada | H04L 12/4641 |
| | | | 370/392 |
| 2014/0304357 A1* | 10/2014 | Bestler | G06F 17/30 |
| | | | 709/213 |
| 2015/0023148 A1* | 1/2015 | Ji | H04L 41/065 |
| | | | 370/216 |
| 2015/0082418 A1* | 3/2015 | Gu | H04L 12/4633 |
| | | | 726/15 |
| 2015/0172165 A1* | 6/2015 | Tessmer | H04L 45/02 |
| | | | 370/254 |
| 2015/0200954 A1* | 7/2015 | Gourlay | H04L 49/70 |
| | | | 726/4 |
| 2016/0211989 A1* | 7/2016 | Jain | H04L 12/4633 |
| 2016/0212008 A1* | 7/2016 | Jain | H04L 12/4633 |

OTHER PUBLICATIONS

Cisco Systems, Inc., "Transparent Layer 2 Protocol Tunneling and PDU Filtering," Cisco IOS Release 12.0(28)S, May 2004, pp. 1-18.
Cisco Systems, Inc., "Layer 2 Tunnel Protocol Version 3," Cisco IOS Release 12.0(23)S, May 12, 2003, pp. 1-84.
Arista, "VXLAN: Scaling Data Center Capacity," White Paper, Aug. 2012, 7 pages.
Cassar, et al., "LISP RLOC Membership Distribution," Internet Engineering Task Force (IETF), Network Working Group, Internet-Draft, Sep. 22, 2014, 16 pages.
Cisco, "VXLAN Overview: Cisco Nexus 9000 Series Switches," White Paper, Nov. 2013, 10 pages.

* cited by examiner

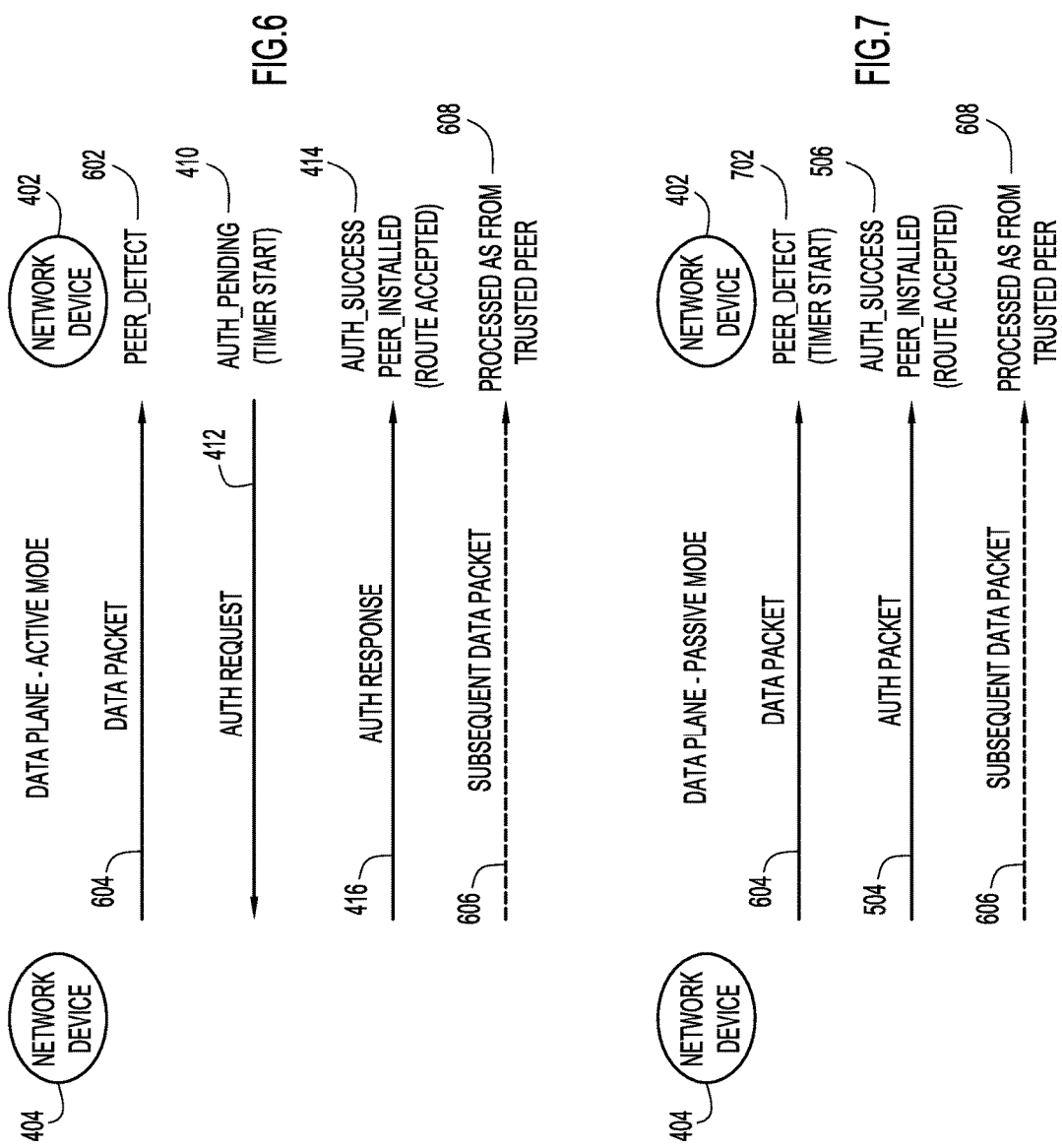

AUTHENTICATION FOR VLAN TUNNEL ENDPOINT (VTEP)

TECHNICAL FIELD

The present disclosure relates to network security.

BACKGROUND

Cloud-based data centers may use Virtual Local Area Networks (VLANs) such as Virtual Extensible Local Area Networks (VxLANs) to extend Layer 2 (L2) networks across Layer 3 (L3) networks. VLAN (including VxLAN) Tunnel Endpoints (VTEPs) encapsulate Ethernet frames from local endpoint systems served by the VTEPs to form VLAN-encapsulated packets (herein "VLAN packets"). The VTEPs tunnel the VLAN-encapsulated packets to peer VTEPs across an Internet Protocol (IP)-based network, such as the Internet.

Some VTEPs may be configured with a static list of VTEP peers. Also, some VTEPs may discover other VTEP peers at runtime when data packets are received from remote VTEPs in the data plane (e.g., unicast or multicast traffic) or when updates are received in the control plane (e.g., BGP-EVPN). The data packets or updates, however, may be sent by network attackers to install rogue VTEPs as peers. VTEPs are not equipped to detect the rogue VTEPs and, therefore, may install them as legitimate VTEP peers. This may cause deleterious effects for the VLAN network and also at the VTEPs and the endpoint systems.

BRIEF DESCRIPTION OF THE DRAWINGS

FIG. 6 illustrates VTEP peer discovery and authentication based on active mode data plane learning, according to an example embodiment.

FIG. 7 illustrates VTEP peer discovery and authentication based on passive mode data plane learning, according to an example embodiment.

DESCRIPTION OF EXAMPLE EMBODIMENTS

Overview

Techniques are provided for dynamically discovering and authenticating peer VTEPs for a VTEP of a VLAN. According to one embodiment, a first network device configured as a first Virtual Local Area Network (VLAN) Tunnel Endpoint (VTEP) may receive a packet from a second network device. The first VTEP may determine that the second network device is a second VTEP and has not been established as a peer VTEP to the first VTEP. The first VTEP may maintain a status for the second network device as authentication pending, receive an authentication packet from the second network device and authenticate the second network device as a peer VTEP using the authentication packet.

Example Embodiments

Virtual Extensible Local Area Network (VxLAN) is one exemplary Virtual Local Area Network (VLAN) framework defined in Internet Engineering Task Force (IETF) RFC 7348 (the "VxLAN IETF") for overlaying virtualized Layer 2 (L2) networks onto Layer 3 (L3) networks, to allow L2 adjacency across the L3 networks. Cloud-based virtualized data centers may use VxLAN techniques to overlay L2 network onto L3 networks within and across the data centers. Using VxLAN, virtual machines (VMs) operating in disparate L2 networks in the data centers may communicate across L3 networks as if the VMs were in the same L2 domain. Each VxLAN overlay is referred to as a VxLAN segment and identified by a unique 24-bit segment identifier called a VxLAN identifier (ID) (VNI). Virtual machines (VMs) on the same VNI but in different data centers may communicate with each other. To this end, the VxLAN overlay carries L2/Ethernet traffic between the VMs over an L3 network in an encapsulated format that incorporates the appropriate VNI to define a logical "VxLAN tunnel." The VxLAN tunnel terminates with network devices referred to as VxLAN Tunnel Endpoints (VTEPs) that encapsulate and decapsulate the Ethernet traffic between the VMs.

Figure 1:
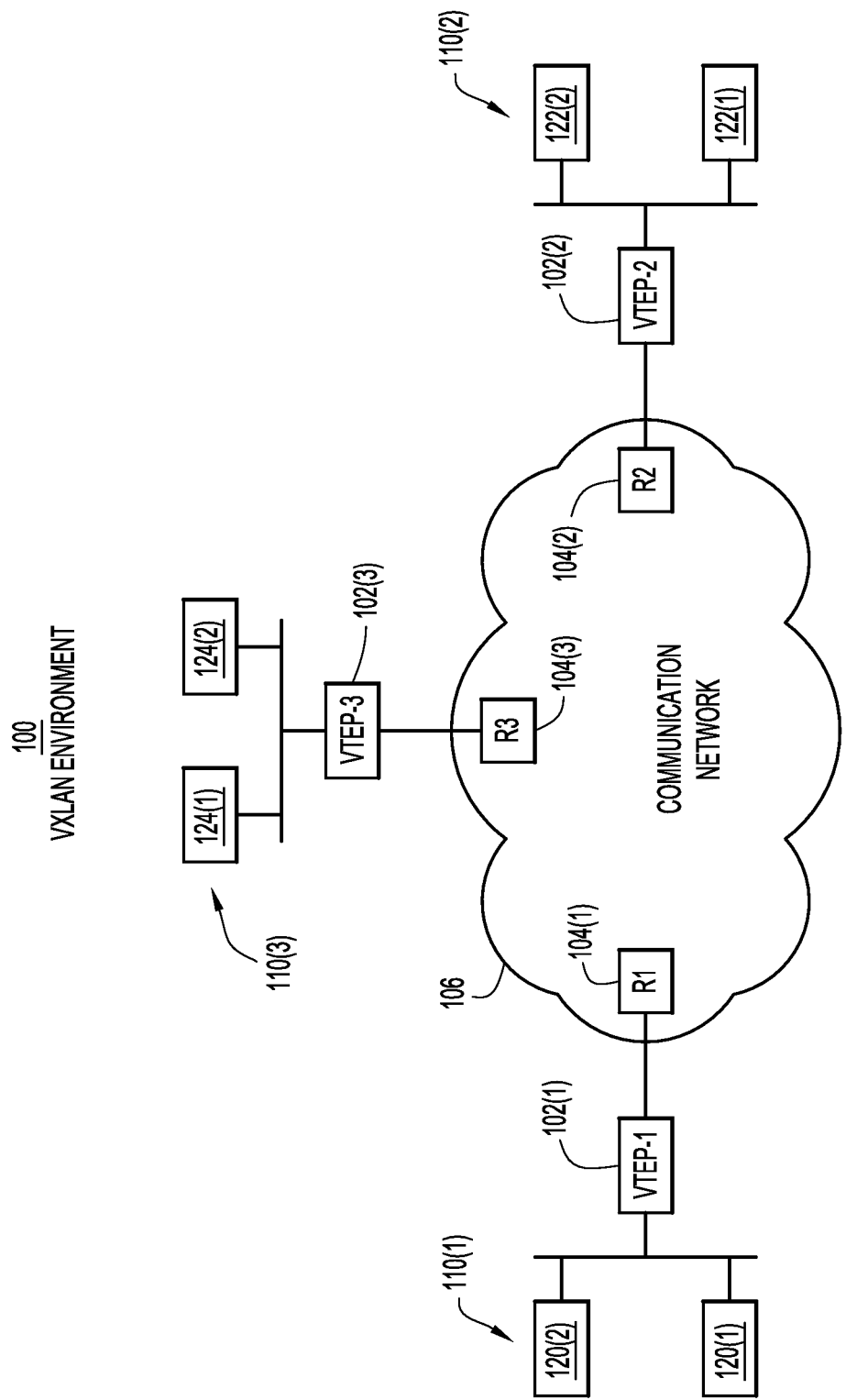
FIG. 1 illustrates a network environment in which Virtual Extensible Local Area Network (VxLAN) techniques may be implemented, according to an example embodiment.

With reference to FIG. 1 there is shown an example network environment 100 in which VxLAN techniques are implemented. Network environment 100 includes VTEPs 102(1)-102(3) (also referred to as VTEP-1-VTEP-3, respectively) each connected to a communication network 106 through respective routers 104(1)-104(3) (also referred to as routers R1-R3). Communication network 106 includes one or more wide area networks (WANs), such as the Internet, and may include one or more local area networks (LANs). VTEPs 102(1)-102(3) are also connected to respective LANs 110(1)-110(3). LANs 110(1), 110(2), and 110(3) include respective sets of endpoint systems 120(1) and 120(2), 122(1) and 122(2), and 124(1) and 124(2). Each endpoint system (e.g., endpoint system 120(1)) may be a server that hosts one or more virtual machines (VMs). Each VTEP, generically referred to by reference numeral 102(i), and the respective LAN, generically referred to by reference numeral 110(i), may be part of a distinct cloud-based data center. Network environment 100 is just an example; more VTEPs and more or less LANs and associated endpoint systems may be present.

At a high level, endpoint systems 120(1)/120(2), 122(1)/122(2), and 124(1)/124(2) operate on the same VxLANs, i.e., on the same VNIs, and communicate with each other over communication network 106 through corresponding VTEPs 102(1), 102(2), and 102(3). For example, endpoint system 120(1) operating on a VxLAN identified as VNI 10 sends an Ethernet frame destined for endpoint system 122(1) also operating on that VNI to local VTEP 102(1). VTEP 102(1) encapsulates the Ethernet frame with a VxLAN encapsulation including VNI 10, and forwards the resulting encapsulated Ethernet packet as a VxLAN-encapsulated packet (VxLAN packet) to VTEP 100(2) over network 106 via routers 104(1) and 104(2). VTEP 102(2) receives the VxLAN packet and decapsulates the VxLAN encapsulation to recover the original Ethernet frame therein from endpoint system 120(1). VTEP 102(2) forwards the Ethernet frame to local endpoint device 122(1).

Figure 2:
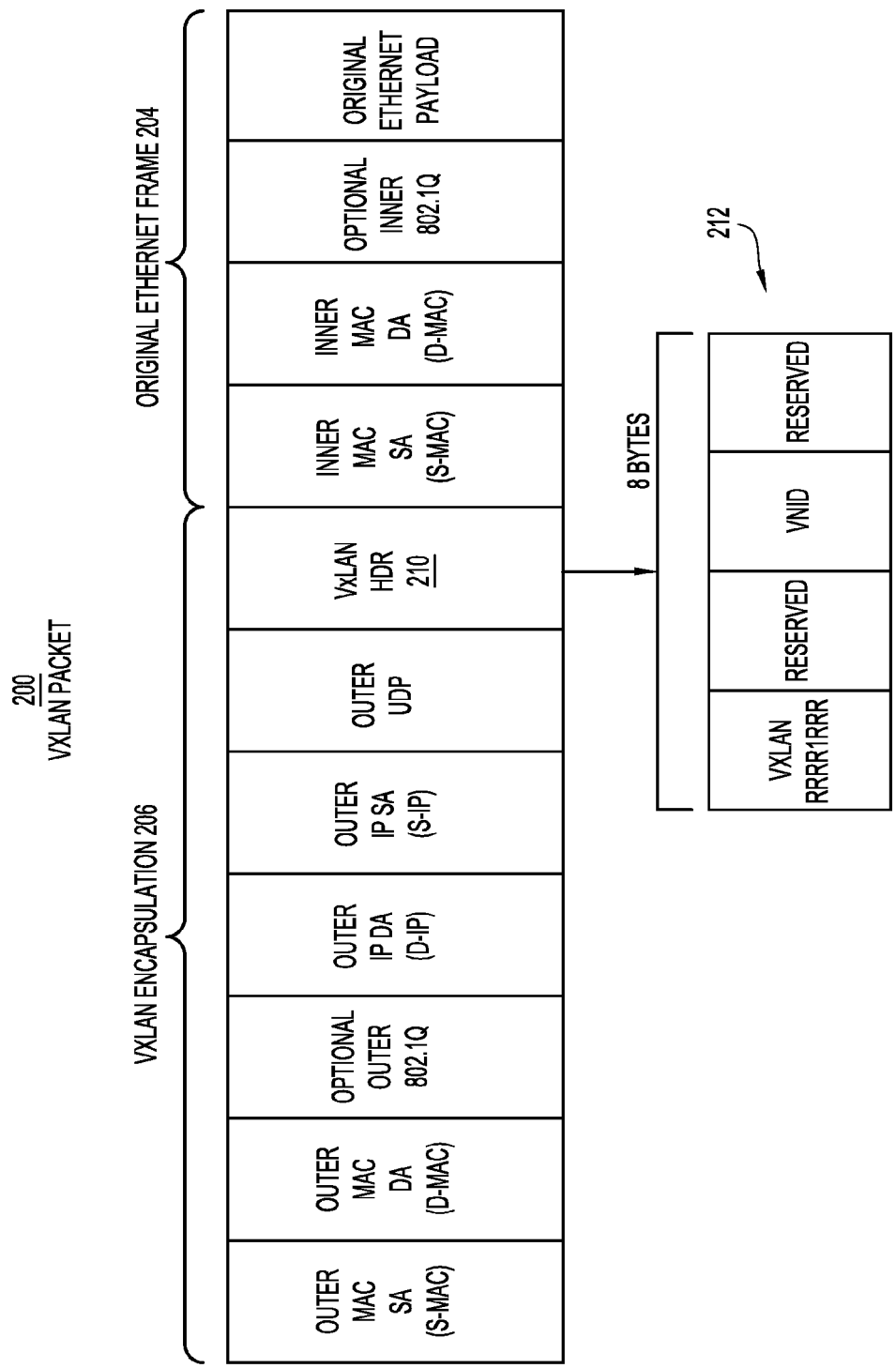
FIG. 2 is an illustration of an example VxLAN packet, according to an example embodiment.

With reference to FIG. 2, there is an illustration of an example VxLAN packet 200 formatted according to the VxLAN IETF-prescribed format. VxLAN packet 200 includes an inner or original Ethernet frame/packet 204 encapsulated by an outer VxLAN encapsulation header 206. In the high level example of FIG. 1, endpoint system 120(1) originates Ethernet frame/packet 204 and VTEP 102(1) encapsulates the Ethernet frame/packet with VxLAN encapsulation 206.

Ethernet frame 204 includes an original Ethernet payload (i.e., data), an optional inner IEEE 802.1Q field, an inner Media Access Control (MAC) destination address (DA) D-MAC, and an inner MAC source address (SA)S-MAC. In the example of FIG. 1, the S-MAC and D-MAC are the respective MAC addresses of endpoint systems 120(1) and 122(1).

VxLAN encapsulation 206 is a User Datagram Protocol (UDP)/Internet Protocol (IP)/MAC (or Ethernet) encapsulation. Specifically, VxLAN encapsulation 206 includes a VXLAN header 210 (shown in expanded view at 212), an outer UDP header, an outer IP SA S-IP (i.e., an IP address of an originating or source VTEP, e.g., VTEP 102(1)), an outer IP DA D-IP (i.e., an IP address of a target VTEP, e.g., VTEP 102(2)), an optional outer 802.1Q field, an outer MAC DA D-MAC, an outer MAC SA S-MAC, and a checksum field (now shown in FIG. 2). The outer D-MAC and S-MAC addresses are used for next hop (or hop-by-hop) routing of VxLAN packet 200 from the originating VTEP to the target VTEP through network 106. VXLAN header 210 includes a 24-bit VxLAN ID (VNI), two reserved fields, and a field referred to as "VXLAN RRRR1RRR."

VxLAN shown in FIGS. 1 and 2 and described above is one example VLAN that the dynamic peer VTEP discovery and authentication techniques described below in connection with FIGS. 3-9 may be applied. It should be noted that the dynamic peer VTEP discovery and authentication techniques may be implemented by any VTEP in any VLAN, not limited to the VxLAN as described above.

Figure 3:
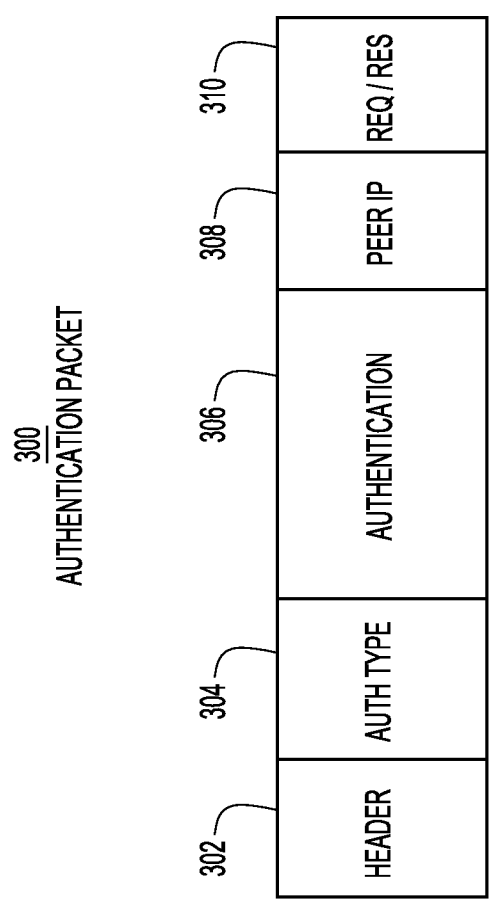
FIG. 3 is an illustration of an example authentication packet, according to an example embodiment.

With reference to FIG. 3, there is an illustration of an example authentication packet 300. As depicted in FIG. 3, the authentication packet 300 may comprise a header field 302, an authentication type field 304, an authentication field 306, a peer IP field 308 and a request/response field 310. The header field 302 may be a standard header in accordance with a transmission protocol by which the authentication packet 300 is transmitted. For example, in one embodiment, the authentication packet 300 may be transmitted using the User Datagram Protocol (UDP) and the header field 302 may be a UDP header.

The peer IP field 308 may contain the IP address of the source network device of the authentication packet 300. The authentication type field 304, the authentication field 306 and the response/request field 310 may contain information in accordance with a type of the authentication packet 300. In one embodiment, there may be three types of authentication packets: authentication request, authentication response, and automatic authentication packet. Details of the three types of the authentication packets and their corresponding authentication type field 304, authentication field 306 and request/response field 310 are described below.

Figure 4:
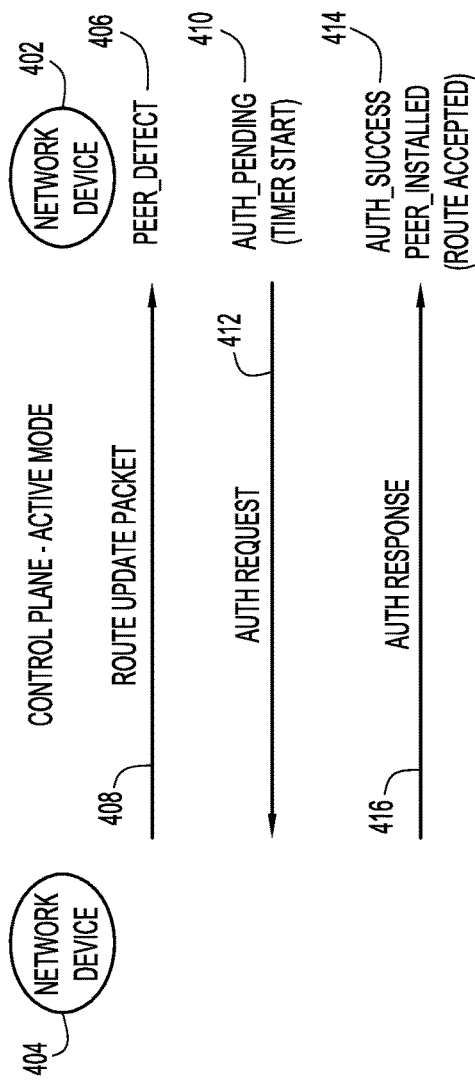
FIG. 4 illustrates VTEP peer discovery and authentication based on active mode control plane learning, according to an example embodiment.

With reference to FIG. 4, there is shown an example VTEP peer discovery and authentication based on active mode control plane learning. In the example of FIG. 4, the network device 402 may be a VTEP of a VLAN (e.g., VTEP 102(1), VTEP 102(2), or VTEP 102(3)) and may be configured in an active mode for peer VTEP detection. At 406, the network device 402 may receive a route update packet 408 from the network device 404 on a control plane (e.g., Border Gateway Protocol-Ethernet VPN (BGP-EVPN)). The route update packet 408 may contain routing information, for example, MAC/MAC-IP, etc. The network device 402 may determine that the route update packet 408 indicates the network device 404 to be a VTEP for the VLAN but the network device 402 has not established the network device 404 as a peer VTEP. In one embodiment, for example, the network device 402 may maintain a peer table that stores all peer VTEPs. In this embodiment, the network device 402 may enter the network device 404 into the peer table but with a peer detection status associated with this entry. At 410, the network device 402 may send an authentication request 412 to the network device 404. In one embodiment, the network device 402 may start a timer when it sends the authentication request 412. Furthermore, if a peer table is used, the status for the network device 404 may be updated to an authentication request sent (or authentication pending) status. In addition, in some embodiments, the authentication request 412 may be sent via unicast.

The authentication request 412 may be one example authentication packet of the type authentication request. In the authentication request 412, the request/response field 310 may include a predetermined value indicating the authentication packet is of the type authentication request. The authentication type field 304 of the authentication request 412 may include a predetermined value indicating what type of authentication is requested by the source network device (e.g. the network device 402). Exemplary types of authentication may include clear text, a cryptographic hash (e.g., MD5, secure hash algorithm (SHA)), a symmetric encryption (e.g., data encryption standard (DES), advanced encryption standard (AES)), or an asymmetric encryption. If the authentication type is clear text, in one non-limiting embodiment, the authentication field 306 may include a request (could be a pre-defined value designated for a pre-defined request), for example, a request for password, a pre-configured security question, a request for an authentication key, etc. In another embodiment, if the authentication type is clear text and only the password (or authentication key) is requested, the authentication field 306 may be undefined (e.g., the content of this field need not to be examined by the recipient). If the authentication type is a cryptographic hash or an encryption, the hash function or encryption algorithm may be identified by a pre-configured value in the authentication type field 304 or in the authentication field 306. If the authentication type is a hash or encryption, in one embodiment, the authentication field 306 may contain a nonce generated by the source (e.g., network device 402).

At 414, an authentication response 416 may be received from the network device 404 at the network device 402. In some embodiments, the authentication response 416 may be sent by the network device 404 via unicast. If a timer is used, the network device 402 may first determine whether the authentication response 416 is received within a pre-configured period of time. For example, if the timer is a count down or count up timer, the network device 402 may determine whether the timer has expired. If the authentication response 416 is received within the pre-configured period of time, the network device 402 may check the content of the authentication response 416. If a peer table is used, the status for the network device 404 may be updated to an authentication response received status.

To be successfully authenticated, the request/response field 310 of the authentication response 416 may include a predetermined value indicating the authentication packet is of the type of authentication response. The authentication type field 304 of the authentication response 416 may include a predetermined value indicating the type of authentication used for the authentication response 416. The authentication field 306 may contain an authentication value based on the authentication type. For example, if the authentication type is clear text, the authentication value may be a clear text response to a challenge (e.g., the challenge presented in the authentication request 412). Examples of challenge/response schemes include password, security question, authentication key, or other known challenge/response. If the authentication type is a cryptographic hash, the authentication value may be a hash of the response to the challenge (e.g., a hash of password, a hash of answer to the security question, etc.). If the authentication type is encryption, the authentication value may be an encryption result. For example, the encryption result may be obtained by applying a pre-configured encryption algorithm to the response to the challenge. In one embodiment, the encryption result may be an encryption result of a password, an answer to the security question, or an authentication key. If a nonce had been sent in the authentication request 412, the nonce may be used as a salt to generate an encryption result of a password, an answer to the security question, or an authentication key, or alternatively, the nonce may be encrypted with the password, the answer to the security question nonce or the authentication key as a salt.

It should be noted that there are various techniques to implement the challenge and response for authentication purposes and the network device 402 and any legitimate peer VTEPs may implement any known challenge and response techniques and any that may be developed in the future. For example, in addition to the examples described above, in some embodiments, the source IP address or other identifying information (e.g., MAC address) of an authentication packet originator may be used as part of the input for the hash function or encryption algorithms (e.g., a password or an authentication key may be concatenated with the source IP/MAC address and the concatenation being used for hash/encryption), so that man-in-the-middle attackers cannot intercept legitimate authentication packets and replay the intercepted packets by replacing a legitimate peer VTEP IP (MAC) address with its own IP (MAC) address. Other known or future developed protection techniques against man-in-the-middle attacks may also be used.

At 414, the network device 402 may determine that the authentication response 416 is satisfactory only when the authentication value matches what is expected, regardless of whether it is clear text, hash or encryption. Once the authentication response 416 is successfully checked, the network device 404 may be authenticated as a peer VTEP and the route indicated in the route update packet 408 may be accepted. In the embodiment that the peer table is used, the status of the network device 404 may be updated to authentication success in the peer table. If the authentication response 416 fails to be authenticated, however, the entry of the network device 404 may be deleted from the peer table.

Figure 5:
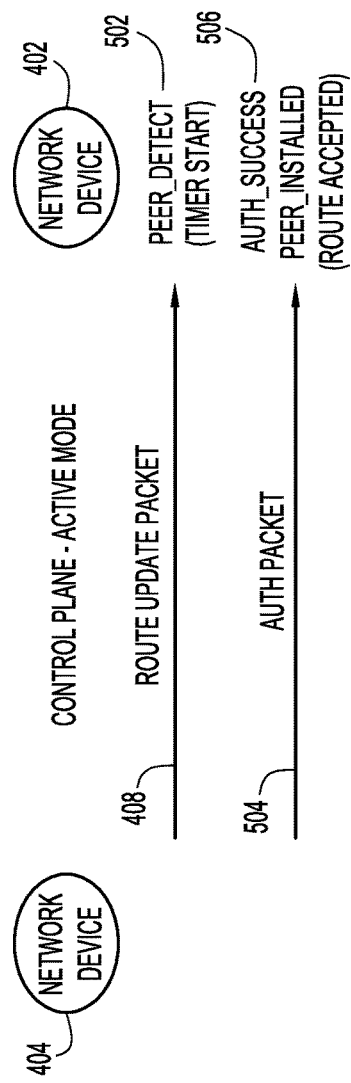
FIG. 5 illustrates VTEP peer discovery and authentication based on passive mode control plane learning, according to an example embodiment.

With reference to FIG. 5, there is shown an example VTEP peer discovery and authentication based on passive mode control plane learning. In the example of FIG. 4, the network device 402 may be a VTEP of a VLAN (e.g., VTEP 102(1), VTEP 102(2), or VTEP 102(3)) that is configured in a passive mode for peer VTEP detection. At 502, the network device 402 may receive a route update packet 408 from the network device 404 on a control plane (e.g., Border Gateway Protocol-Ethernet Virtual Private Network (BGP-EVPN)). The network device 402 may determine that the route update packet 408 indicates the network device 404 to be a VTEP for the VLAN but the network device 402 has not established the network device 404 as a peer VTEP. Thus, the network device 402 may enter a peer detection status for the network device 404 (e.g., in the peer table for the entry of the network device 404). In contrast to the example of FIG. 4, in the passive mode, the network device 402 does not send any authentication request but simply waits for an authentication packet to be received from the network device 404. In one embodiment, the network device 402 may start a timer when it receives the route update packet 408 and starts waiting for the authentication packet.

At 506, an authentication packet 504 may be received from the network device 404. In some embodiments, the authentication packet 504 may be sent by the network device 404 on a multicast path with its destination being a multicast group address for a multicast group that the network device 402 has joined to serve Layer 2 broadcast, unknown unicast, and multicast traffic. If a timer is implemented by the network device 402, the network device 402 may first determine whether the authentication packet 504 is received within a pre-configured period of time. For example, if the timer is a count down or count up timer, the network device 402 may determine whether the timer has expired. If the authentication packet 504 is received within the pre-configured period of time, the network device 402 may check the content of the authentication packet 504.

To be successfully authenticated, the request/response field 310 of the authentication packet 504 may include a predetermined value indicating that the authentication packet 504 is of the type of automatic authentication packet. The authentication type field 304 of the authentication packet 504 may include a predetermined value indicating the type of authentication used for the authentication packet 504. The authentication field 306 may contain an authentication value in accordance with the authentication type. For example, if the authentication type is clear text, the authentication value may be a clear text (e.g., a password, or a pre-configured secret such as an authentication key). If the authentication type is a cryptographic hash, the authentication value may be a hash, for example, a hash of a password or pre-configured secret. If the authentication type is encryption, the authentication value may be an encryption result. For example, the encryption result may be obtained by applying a pre-configured encryption algorithm to a password or pre-configured secret. In some embodiments, the protection against man-in-the-middle attacks described herein, such as, but not limited to, using the source IP/MAC address as part of input for the hash/encryption, and other known or future developed techniques, may also be implemented in the automatic authentication packet.

Similar to 414 of FIG. 4, at 506, the network device 402 may determine that the authentication packet 504 is satisfactory only when the authentication value matches what is expected, regardless of whether it is clear text, hash or encryption. Once the authentication packet 504 is successfully checked, the network device 404 may be authenticated as a peer VTEP and the route indicated in the route update packet 408 may be accepted. In one embodiment, if a peer table is implemented, the status of the network device 404 may be updated as authenticated and the route of the network device 404 may be accepted.

With reference to FIG. 6, there is shown an example VTEP peer discovery and authentication based on active mode data plane learning. In the example of FIG. 6, the network device 402 may be a VTEP of a VLAN (e.g., VTEP 102(1), VTEP 102(2), or VTEP 102(3)) configured in an active mode for peer VTEP detection. At 602, the network device 402 may receive a data packet 604 from the network device 404 on a data plane. The data packet 604 may have a format that conforms to any common VLAN data packet received and transmitted by the network device 402 regularly. The network device 402 may determine that the source of the data packet 604 (e.g., the network device 404) to be a VTEP for the VLAN but the network device 402 has not established the network device 404 as a peer VTEP. After the initial detection phase 602, being in the same active mode as in FIG. 4, the network device 402 may operate identically as described above at 410 and 414 in connection with FIG. 4, and the authentication request 412 and authentication response 416 may also be similar to that described above in connection with FIG. 4.

The network device 402 may receive one or more subsequent data packets 606 from the network device 404. These one or more subsequent data packets 606 may be received any time after the data packet 604 but not necessarily before the network device 404 is established as an authenticated peer VTEP at 414. If any subsequent data packets 606 is received before the network device 404 is authenticated as a peer VTEP, the received data packets 606 may be stored in a temporary storage, such as a buffer or a queue, without being processed. In one embodiment, the data packet 604 may also be stored in the temporary storage without being processed. Once the network device 404 is authenticated as a peer VTEP and its IP address is accepted as a legitimate route for the VLAN at 414, at 608, the data packet 604 and subsequently received data packets 606 may be processed as legitimate data packets transmitted by a trusted peer VTEP.

With reference to FIG. 7, there is shown an example VTEP peer discovery and authentication based on passive mode data plane learning. In the example of FIG. 7, the network device 402 may be a VTEP of a VLAN (e.g., VTEP 102(1), VTEP 102(2), or VTEP 102(3)) configured in a passive mode for peer VTEP detection. At 702, the network device 402 may receive the data packet 604 from the network device 404 on a data plane. The network device 402 may determine that the data packet 604 indicates the network device 404 to be a VTEP for the VLAN but the network device 402 has not established the network device 404 as a peer VTEP. After the initial detection phase 702, being in the same passive mode as in FIG. 5, the network device 402 may operate identically at 506 as that of FIG. 5, and the authentication packet 504 may also be identical as that of FIG. 5.

The network device 402 may also receive one or more subsequent data packets 606 from the network device 404 in the example of FIG. 7, and the network device 402 may also treat the data packet 604 and one or more subsequent data packets 606 identically as that of FIG. 6. Once the network device 404 is authenticated as a peer VTEP and its IP address is accepted as a legitimate route for the VLAN at 506, the data packet 604 and subsequently received data packets 606 may be processed as legitimate data packets transmitted by a trusted peer VTEP at 608.

Figure 8:
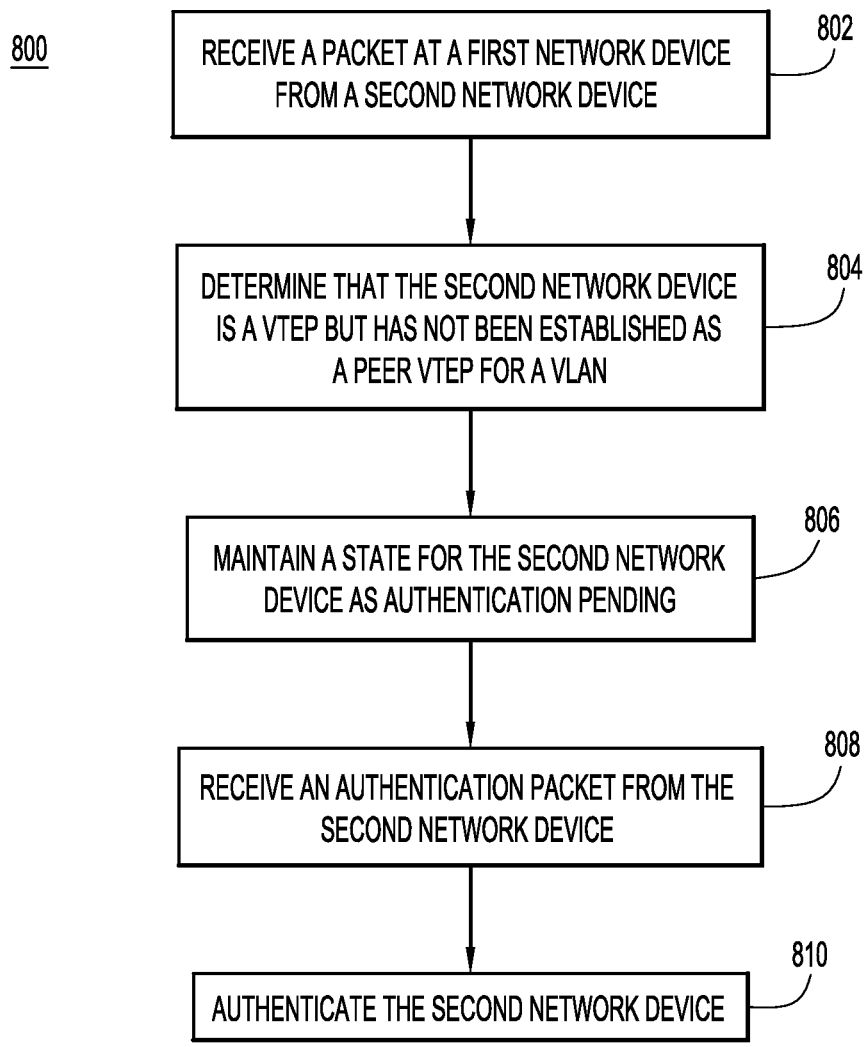
FIG. 8 is a flowchart of an example method of authenticating a peer VTEP, according to an example embodiment.

With reference to FIG. 8, a flowchart is shown of a method 800 of authenticating a peer VTEP, according to an example embodiment. Method 800 may be performed by any of VTEPs 102(1)-102(3) referred to above in connection with FIG. 1. At 802, a first network device may receive a packet from a second network device. For example, as shown in FIGS. 4-7 and described above, the network device 402, which may be the first network device, may receive a packet from the network device 404, which may be the second network device. The received packet may be a data packet (e.g., data packet 604) received on a data plane or a route update packet (e.g., route update packet 408) received on a control plane. At 804, the first network device may determine that the remote network device is a VTEP but has not been established as a peer VTEP for the VLAN.

At 806, the first network device may maintain a status for the second network device as authentication pending. As described above, in some embodiment, the network device 402 may implement a timer, which may be count down or count up for a pre-determined period of time. If there are any data packets received from the second network device during the authentication pending period, these received data packets and an initial data packet that triggers the authentication process may be stored temporarily without being processed. If the network device 402 is in an active mode, it may transmit an authentication request to the second network device when it enters the authentication pending status. If the network device 402 is in a passive mode, no authentication request is sent to the second network device.

At 808, an authentication packet may be received from the second network device. If the network device 402 is in an active mode, the received authentication packet may be an authentication response to the authentication request. If the network device 402 is in a passive mode, the received authentication packet may be an automatic authentication packet, which may be sent out periodically by a network device acting as a VTEP on a control plane via multicast.

At 810, the second network device may be authenticated. For example, the network device 402 may use the received authentication packet to decide whether the network device 404 knows a shared secret (e.g., a password, an answer to a security question, an authentication key etc.). If the second network device is authenticated, it may be established as a trusted peer VTEP. If, however, the second network device fails the authentication, it may be treated as a rogue VTEP.

Figure 9:
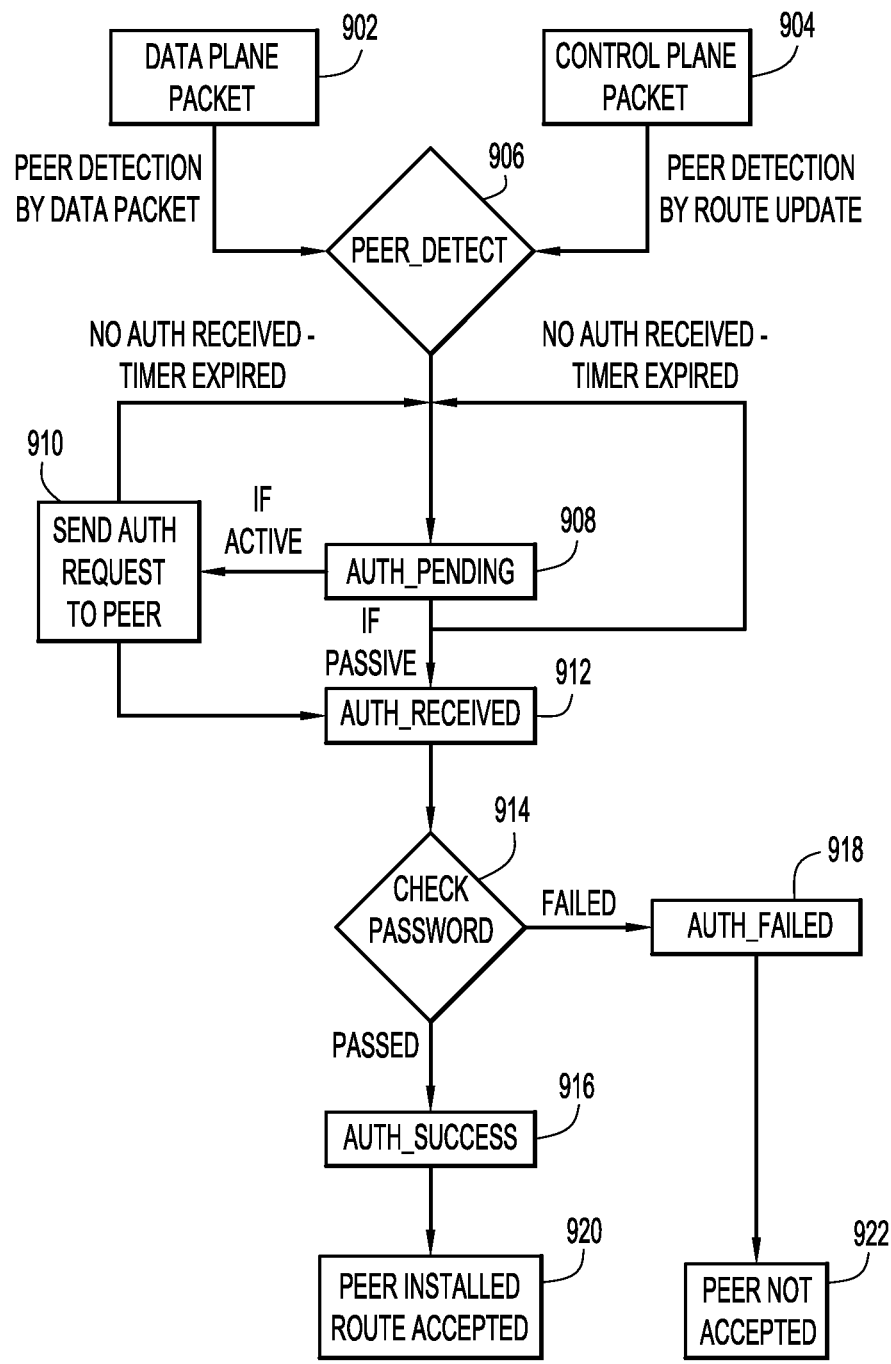
FIG. 9 is a flowchart of another example method of authenticating a peer VTEP, according to an example embodiment.

With reference to FIG. 9, a flowchart is shown of a method 900 of determining whether a remote network device (e.g., network device 404) is a legitimate peer VTEP at a given VTEP (e.g., network device 402), according to an example embodiment. At 906, the VTEP may be at a peer detection status if either a data plane packet 902 or a control plane packet 904 is received from a peer VTEP that has not been authenticated. Peer authentication may be triggered by receipt of the data plane packet 902 or the control plane packet 904.

At 908, the VTEP may enter an authentication pending status for the peer VTEP. If the VTEP is in an active mode, an authentication request may be sent to the peer VTEP at 910. Regardless of whether the VTEP is in an active mode or a passive mode, the VTEP may maintain the authentication pending status. At 912, an authentication packet may be received and the VTEP may update the peer status to authentication received. For example, the authentication packet may be an authentication response 416 or an automatic authentication packet 504 as described herein.

At 914, the received authentication packet may be checked according to an authentication mechanism, such as a password or an authentication key. If the security check passes, the peer status may be updated to authentication success at 916 and the peer VTEP may be installed as a trusted peer VTEP and its route (e.g., IP address, MAC/MAC-IP, etc.) may be accepted at 920. If the security check fails, the peer status may be updated to authentication failed at 918 and the peer VTEP may be deleted from a peer table and its route (e.g., IP address, MAC/MAC-IP, etc.) may be rejected at 922.

Figure 10:
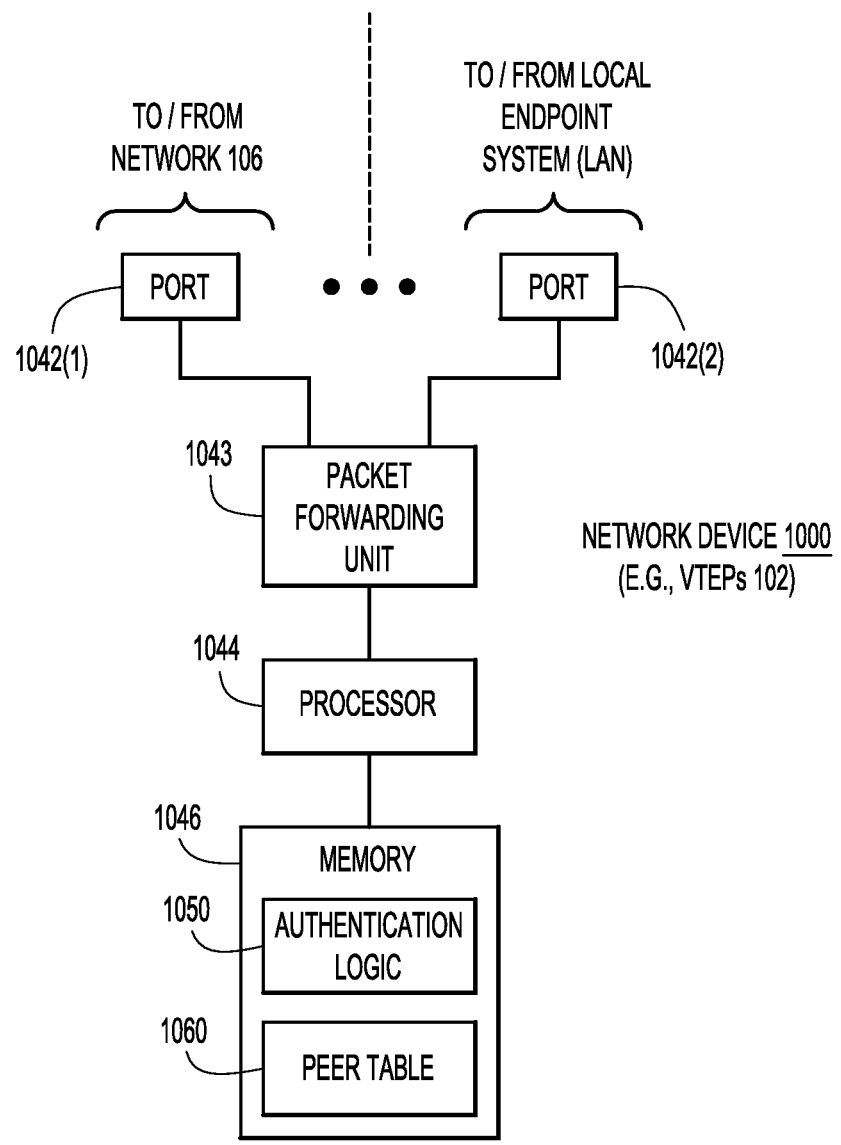
FIG. 10 is an example block diagram of a network device configured to perform the peer VETP authentication methods presented herein, according to an example embodiment.

With reference to FIG. 10, there is an example block diagram of a network device 1000 configured to perform methods 800, 900 and other operations described herein. The network device 1000 is representative of any of VTEPs 102 (e.g., the network devices 402 and 404). The network device 1000 may comprise a plurality of ports 1042(1)-1042(M), a packet forwarding/processing unit 1043, a processor 1044, and a memory 1046. Some ports among ports 1042(1)-1042(M) may be configured to receive/send packets, such as VLAN or VxLAN packets, from/to network 106. Other ports among ports 1042(1)-1042(M) may be configured to receive/send packets, such as Ethernet/LAN frames or packets, from/to network endpoint systems local to the network device 1000 (e.g., in a LAN connected to the VTEP). Ports 1042(1)-1042(M) may include wired and/or wireless ports. The packet forwarding/processing unit 1043 may be, for example, one or more application specific integrated circuits that include buffers, queues, and other control logic for performing packet forwarding operations. The processor 1044 may be a microcontroller or microprocessor that is configured to perform higher level controls of the network device 1000. To this end, the memory 1046 may store software instructions that, when executed by the processor 1044, cause the processor 1044 to perform a variety of operations including operations described herein. For example, the memory 1046 may store instructions for the authentication logic 1050 to perform method 800 and 900 (including a timer if it is implemented), and data for a peer table 1060.

Memory 1046 may include read only memory (ROM), random access memory (RAM), magnetic disk storage media devices, optical storage media devices, flash memory devices, electrical, optical, or other physical/tangible memory storage devices. Thus, in general, the memory 1046 may comprise one or more tangible (e.g., non-transitory) computer readable storage media (e.g., a memory device) encoded with software comprising computer executable instructions and when the software is executed (by the processor 1044) it is operable to perform the operations described herein in connection with the authentication logic 1050.

It should be appreciated that in other embodiments, the network device 1000 may include fewer or more modules apart from those shown in FIG. 10. In another example, the module 1050 may be in the form of firmware that is processed by Application Specific Integrated Circuits (ASICs), which may be integrated into a circuit board. Alternatively, the module 1050 may be in the form of one or more logic blocks included in a programmable logic device (e.g., a field-programmable gate array). The described module 1050 may be adapted, and/or additional structures may be provided, to provide alternative or additional functionalities beyond those specifically discussed in reference to FIG. 10. Modifications or additions to the structures described in relation to FIG. 10 to implement these alternative or additional functionalities are envisioned without departing from the scope and spirit of the embodiments presented herein.

The techniques provided herein may provide a way for VTEPs to authenticate each other and accept updates from validated peers. VTEPs may implement the operations described herein to identify other valid VTEPs in the network by using authentication methods that may adapt strong cryptographic algorithm (e.g., SHA/MD5, AES, DES or any existing or future developed cryptographic algorithm). These techniques may provide several advantages for secure network operation. For example, rouge VTEPs cannot get into the network because they will fail the authentication, and snooping attacks and network disruption may be prevented. Even with strong cryptographic algorithm security, the authentication mechanism is still "light-weight" for VLAN (including VxLAN) gateways. The techniques do not conflict with any existing security implementations of VLAN (including VxLAN) security and may be implemented as additional features complementary to existing security implementations. Moreover, the authentication mechanism may be implemented as an out-of-band method, therefore there is no need to make any changes to the existing VLAN (including VxLAN) standard.

In summary, in one form, a method is provided comprising: at a network device configured as a Virtual Network Tunnel Endpoint (VTEP): receiving a packet from a second network device, determining that the second network device is a second VTEP and has not been established as a peer VTEP to the first VTEP, maintaining a status for the second network device as authentication pending; receiving an authentication packet from the second network device; and authenticating the second network device as a peer VTEP using the authentication packet.

In summary, in another form, an apparatus is provided comprising: one or more network ports configured to send/receive data packets to/from a communication network; a processor coupled to the network ports, and configured to: receive a packet from a network device; determine that the network device is a Virtual Network Tunnel Endpoint (VTEP) and has not been established as a peer VTEP (to the apparatus); maintain a status for the network device as authentication pending; receive an authentication packet from the network device; and authenticate the network device as a peer VTEP using the authentication packet.

In summary, in yet another form, a non-transitory computer readable storage media is provided that stores instructions that, when executed by a processor of a first network device configured as a first Virtual Local Area Network (VxLAN) Tunnel Endpoint (VTEP), cause the processor to: receive a packet from a second network device; determine that the second network device is a second VTEP and has not been established as a peer VTEP to the first VTEP; maintain a status for the second network device as authentication pending; receive an authentication packet from the second network device; and authenticate the second network device as a peer VTEP using the authentication packet.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:
1. A method comprising:
   at a first network device configured as a first Virtual Network Tunnel Endpoint (VTEP):
      receiving a packet from a second network device;

determining that the second network device is a second VTEP and has not been established as a peer VTEP to the first VTEP;
maintaining a status for the second network device as authentication pending;
if the first VTEP is configured to be in an active mode:
sending an authentication request packet to the second network device;
receiving an authentication response packet from the second network device in reply to the authentication request packet; and
authenticating the second network device as a peer VTEP using the authentication response packet;
changing the status for the second network device to authenticated; and
adding the second network device as an authenticated peer VTEP.

2. The method of claim 1, further comprising:
determining whether the first VTEP is configured to be in the active mode.

3. The method of claim 1, wherein sending the authentication request packet includes:
sending the authentication request packet as a unicast frame.

4. The method of claim 1, further comprising:
determining that the first VTEP is configured to be in a passive mode; and
determining that the authentication response packet is received on a multicast path with its destination being a multicast group address for a multicast group that the first VTEP has joined to serve Layer 2 broadcast traffic, unknown unicast traffic, and multicast traffic.

5. The method of claim 1, wherein the packet is a data packet, the method further comprising:
before authenticating the second network device, buffering the data packet without accepting the data packet as legitimate data traffic; and
after authenticating the second network device, accepting the data packet as legitimate data traffic.

6. The method of claim 1, wherein the packet is a route update packet received on a control plane.

7. The method of claim 1, further comprising:
starting a timer when the status for the second network device is marked as authentication pending, wherein
authenticating the second network device includes authenticating the second network device based on whether the timer has expired.

8. The method of claim 1, wherein authenticating the second network device includes determining that the authentication response packet indicates that the second network device has been configured with a predefined secret.

9. An apparatus comprising:
one or more network ports to send/receive data packets to/from a communication network; and
a processor coupled to the network ports, and configured to:
receive a packet from a network device;
determine that the network device is a Virtual Network Tunnel Endpoint (VTEP) and has not been established as a peer VTEP;
maintain a status for the network device as authentication pending;
if the apparatus is configured to be in an active mode:
send an authentication request packet to the network device;
receive an authentication response packet from the network device in reply to the authentication request packet; and
authenticate the network device as a peer VTEP using the authentication response packet;
change the status of the network device to authenticated; and
add the network device as an authenticated peer VTEP.

10. The apparatus of claim 9, wherein the processor is further configured to:
determine whether the apparatus is configured to be in the active mode.

11. The apparatus of claim 9, wherein the processor is further configured to:
determine that the apparatus is configured to be in a passive mode; and
determine that the authentication response packet is received on a multicast path with its destination being a multicast group address for a multicast group that the apparatus has joined to serve Layer 2 broadcast traffic, unknown unicast traffic, and multicast traffic.

12. The apparatus of claim 9, wherein the packet is a data packet, the processor further configured to:
before authenticating the network device, buffer the data packet without accepting the data packet as legitimate data traffic; and
after authenticating the network device, accept the data packet as legitimate traffic.

13. The apparatus of claim 9, wherein the processor is further configured to:
start a timer when the status for the network device is marked as authentication pending, wherein
the processor is configured to authenticate the network device based on whether the timer has expired.

14. The apparatus of claim 9, wherein the processor is configured to authenticate the network device by determining that the authentication response packet indicates that the network device has been configured with a predefined secret.

15. A non-transitory computer readable storage media encoded with instructions that, when executed by a processor of a first network device configured as a first Virtual Local Area Network (VLAN) Tunnel Endpoint (VTEP), cause the processor to:
receive a packet from a second network device;
determine that the second network device is a second VTEP and has not been established as a peer VTEP to the first VTEP;
maintain a status for the second network device as authentication pending;
if the first VTEP is configured to be in an active mode:
send an authentication request packet to the second network device;
receive an authentication response packet from the second network device in reply to the authentication request packet; and
authenticate the second network device as a peer VTEP using the authentication response packet;
change the status of the second network device to authenticated; and
add the second network device as an authenticated peer VTEP.

16. The non-transitory computer readable storage media of claim 15, further comprising instructions to cause the processor to:
determine whether the first VTEP is configured to be in the active mode.

17. The non-transitory computer readable storage media of claim 15, further comprising instructions to cause the processor to:

determine that the first VTEP is configured to be in a passive mode; and determine that the authentication response packet is received on a multicast path with its destination being a multicast group address for a multicast group that the first VTEP has joined to serve Layer 2 broadcast traffic, unknown unicast traffic, and multicast traffic.

18. The non-transitory computer readable storage media of claim 15, wherein the packet is a data packet, the non-transitory computer readable storage media further including instructions to cause the processor to:

before authenticating the second network device, buffer the data packet without accepting the data packet as legitimate data traffic; and after authenticating the second network device as a peer VTEP, accepting the data packet as legitimate data traffic.

19. The non-transitory computer readable storage media of claim 15, further comprising instructions to cause the processor to:

start a timer when the status for the second network device is marked as authentication pending, wherein the instructions to cause the processor to authenticate the second network device include instructions to cause the processor to authenticate the second network device based on whether the timer has expired.

20. The non-transitory computer readable storage media of claim 15, wherein the instructions to cause the processor to authenticate the second network device include instructions to cause the processor to determine that the authentication response packet indicates that the second network device has been configured with a predefined secret.

* * * * *